Figure 1:
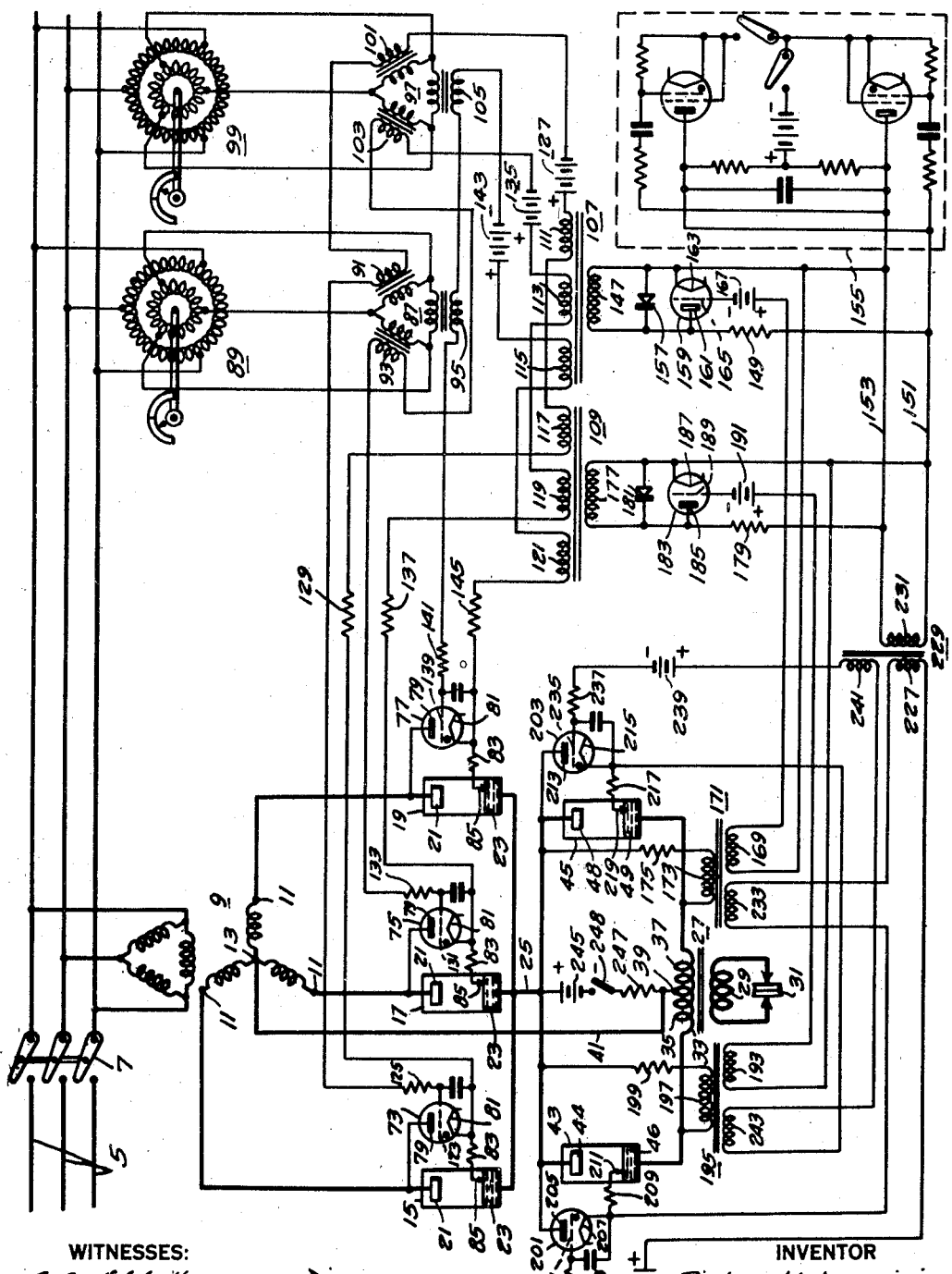

Nov. 18, 1947.   R. L. LONGINI   2,431,262
CONVERSION SYSTEM
Filed Aug. 18, 1945   2 Sheets-Sheet 2
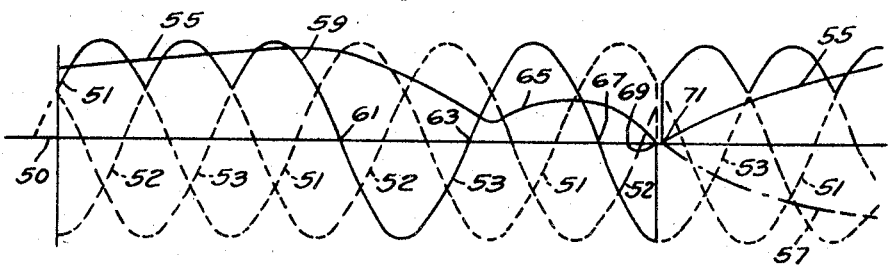
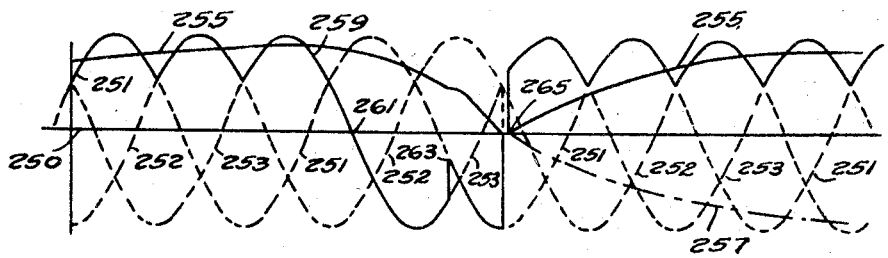
WITNESSES:
INVENTOR
Richard L. Longini.
BY
ATTORNEY Patented Nov. 18, 1947

2,431,262

UNITED STATES PATENT OFFICE 2,431,262

CONVERSION SYSTEM

Richard L. Longini, Forest Hills, Pa., assignor to Westinghouse Electric Corporation, East Pittsburgh, Pa., a corporation of Pennsylvania Application August 18, 1945, Serial No. 611,409

12 Claims. (Cl. 171—97)

This invention relates to an electronic control system and it has particular relation to a control system useful in resistance welding in which a polyphase alternating current is changed to a single-phase current of a different frequency.

In some resistance welding machines now in commercial use, a control system is employed which converts three-phase alternating current of a sixty-cycle per second frequency from the supply lines to a single-phase alternating current of a frequency of the order of four cycles per second. The low frequency current is then employed to produce the actual weld. The principal purposes of such an arrangement are to present a balanced load to the three-phase supply system with but a single-phase load device and to reduce the kilovolt-ampere demand and increase the power factor over that of a single-phase welding machine supplied from a single phase of the three-phase supply system.

In these prior circuits, a rectifier unit is provided which includes a main electric valve, such as an ignitron for each phase of the supply voltage. The main valves are employed to rectify the three-phase alternating voltage and provide a unidirectional current output to be supplied to a welding transformer. The welding transformer includes an iron core, a primary winding having two sections, and a secondary winding which is connected across the welding load. An auxiliary unidirectional valve is provided for each section of the primary winding, with each auxiliary valve connected in circuit with the corresponding section across the output of the rectifier unit in such manner that current through one of the auxiliary valves and its associated section produces a load current in one direction, while current through the other auxiliary valve and section produces an opposite load current.

In the operation of the prior controls, the rectifier unit supplies unidirectional current to the auxiliary valves which are rendered conductive alternately to produce an alternating load current of the desired frequency. When the rectifier unit supplies current through one of auxiliary valves and its associated section, the primary current gradually increases. When the primary current reaches a predetermined value, a maximum current relay is arranged to effect interruption of the current from the rectifier to permit the load current to decay to zero. The interruption is not sudden but is accomplished by opening the ignition circuit of the ignitrons functioning as the main valves. Only one of the main valves is conductive at any time so those which are nonconductive at the instant the ignition circuits are opened are prevented from becoming conductive in their turn, and the main valve which is conductive at that instant continues to conduct until the current therethrough drops below the minimum value necessary to maintain it conductive.

When the supply of current from the rectifier unit is completely interrupted and the auxiliary valve which was conductive has consequently become nonconductive, the ignition circuits of the main valves are reclosed and the supply of unidirectional current therefrom is resumed. However, a minimum current relay is arranged to cause the other auxiliary valve to become conductive when the current supply is resumed so that the load current flows in the opposite direction. By repeating this operation, a single-phase alternating current is produced in the load circuit, the frequency of which is low with respect to the supply frequency and is determined by the setting of the maximum current relay and associated control circuits.

A load current having a low frequency fundamental and several harmonics may be produced by the described prior structure. However, certain difficulties have been encountered. In particular, it has been found that in many cases the kilovolt-ampere demand is not reduced substantially as desired.

It is, accordingly, an object of my invention to provide a new and improved control system for changing polyphase alternating current to a single-phase alternating current.

A further object of my invention is to provide a new and improved circuit arrangement for changing polyphase alternating current of one frequency to a single-phase alternating current of a lower frequency.

A further object of my invention is to provide a new and improved circuit for changing a polyphase alternating current of one frequency to a single-phase alternating current of a lower frequency in which the kilovolt-ampere demand is appreciably reduced.

More specifically, it is an object of my invention to provide a novel control system particularly useful with a resistance welding machine having a single-phase load to be supplied from a polyphase voltage supply source.

My invention arises from the discovery that the operation of the prior controls, as described, results, under certain conditions, in a commutation fault which increases the kilovolt-ampere demand. I have discovered that the commutation fault occurs if, after further ignition of the main valves is blocked, as by opening the ignition circuits in the prior structures, the current in the primary winding circuit lags behind the supply voltage to an extent that the current does not reach zero before the phase voltage corresponding to the conductive main valve passes through zero and through its succeeding negative half period and again becomes positive. Under such conditions, energy is again drawn from the supply lines upon the phase voltage again becoming positive and the load current, which has previously been decreasing, is increased before its decrease to zero is continued. This causes the magnitude of the harmonics of about the supply frequency to increase very greatly without a corresponding increase in the kilowatts consumed. Since the inductance of the secondary winding circuit of the resistance welding machine is considerable, the conditions therein are highly favorable for commutation faults. A more complete and detailed explanation of the nature of the commutation fault present in the prior structures is given hereinafter with reference to the drawings.

In accordance with my invention, commutation faults of this nature are avoided by a different mode of operation of the main valves formerly used only as rectifiers. I propose to operate the main valves initially as rectifiers to supply the unidirectional current as before. However, when it is desired to change the direction of the load current, the main valves, while prevented from operating as rectifiers, are controlled to function as inverters. As a result, the load current is forced to zero without any commutation faults.

The novel features of my invention are set forth with more particularity in the accompanying claims. The invention itself, however, with respect to the details thereof together with additional objects and advantages may be better understood from the following description of a specific embodiment with reference to the accompanying drawings, in which:

Figure 1 is a schematic circuit diagram of a control system embodying my invention;

Fig. 2 comprises a plurality of curves showing voltage and current relations in prior controls during a commutation fault; and Fig. 3 comprises a plurality of curves showing voltage and current relations in the operation of the control system shown in Fig. 1.

As shown in Fig. 1, the power circuit receives energy from three-phase supply lines 5 connected through a circuit breaker 7 to a three-phase supply transformer 9. The supply transformer 9 has an output terminal 11 for each phase and a common return terminal 13. Three main electric discharge valves 15, 17 and 19 of the arc-like type, such as ignitrons, are provided to correspond with the three-phase voltages with each main valve having an anode 21 connected to the corresponding output phase terminal 11 of the supply transformer 9 and a cathode 23 connected to a common line 25.

A welding transformer 27 is provided with a secondary winding 29 connected across the resistance welding load 31 and a primary winding 33 having two sections 35 and 37. The primary winding 33 of the welding transformer is preferably formed of a single coil having end terminals and a center tap 39. The center tap 39 is connected by line 41 to the return terminal 13 of the supply transformer 5, and a pair of auxiliary electric discharge valves 43 and 45 of the arc-like type, such as ignitrons, connect the end terminals to the common line 25. In this arrangement, the first auxiliary valve 43 has its anode 44 and cathode 46 connected in circuit between the common line 25 and one terminal of the primary winding 33 at the end of section 35 so that current from the common line 25 through the first auxiliary valve 43 and the primary section 35 between said one terminal and the center tap 39 produces a secondary winding current in one direction. The second auxiliary valve 45 has its anode 48 and cathode 49 connected between the common line 25 and the other terminal of the primary winding 33 at the end of section 37 so that current from the common line 25 through the second auxiliary valve 45 and the primary section 37 between the other terminal and center tap 39 produces a secondary winding current in the opposite direction.

To enable a better understanding of the improvement afforded through my invention, it is believed highly desirable to consider in some detail the operation of the prior structures previously described. In these prior structures, the same general power circuit arrangement is employed as is shown in Fig. 1 but the operation and control of the main and auxiliary valves is different and the commutation fault therein is as illustrated in Fig. 2.

In Fig. 2, time is represented along the horizontal axis, while voltage and current are represented along the vertical axis with horizontal line 50 representing zero current and zero voltage. The sine wave curves 51, 52 and 53, shown partially in full line and partially in dotted line, represent the three-phase voltages of the supply transformer 9 and correspond to the phase voltages for main valves 15, 17 and 19, respectively. The full line portion of each of these curves 51, 52 and 53 represents that part of the phase voltage during which the corresponding main valve 15, 17 or 19 is conductive, while the dotted line portion represents that part in which the corresponding main valve is nonconductive. The other full line curve 55 represents the current through the common line 25. Succeeding pulses of this current flow in the same direction so curve 55 is never below the zero line 50, although the corresponding secondary winding current flows alternately in opposite directions as represented by curve 55 at the left of the figure and by the broken line curve 57 at the right of the figure.

The curves shown in Fig. 2, illustrating the operation of the prior structures, are expanded horizontally so that a full cycle of the low frequency current is not shown. The conditions represented at the extreme left end of the figure are those which exist after current has been supplied for some time through the main valves 15, 17 and 19, the first auxiliary valve 43 and the first section 35 of the primary winding 33. The main valves are rendered conductive in succession, each becoming conductive as the corresponding phase voltage becomes more positive than the other phase voltages. Consequently, main valve 15 is conductive during the most positive portion of curve 51 and main valve 17 is conductive during the succeeding most positive portion of curve 52 and main valve 19 is conductive during the succeeding most positive portion of curve 53. During this time the current curve 55 is gradually rising. Let it be assumed that at the point 59 the controls of the prior structure opens the ignition circuits of the main valves 15, 17 and 19. Those main valves 15 and 17, which are nonconductive at the time, can not become conductive in their turn and remain nonconductive. The main valve 19 which is conducting at the point 59 continues to conduct current as the phase voltage curve 53 drops to zero at the point 61. Because of the inductance in the circuit, the current curve 55, while gradually dropping, is still highly positive at the point 61 and the conductive main valve 19 continues to conduct even though the corresponding phase voltage curve 53 becomes negative. The phase voltage curve 53 corresponding to the conducting main valve 19 returns to the zero line 50 at point 63 and starts to enter its positive half period. If the current curve 55 is still positive at this time, the conductive main valve 19 remains conductive and during the following positive half period of the corresponding phase voltage curve 53 energy is drawn from the supply transformer 9 causing the current curve 55, which has been dropping gradually, to rise as at 65. It is this current increase which increases the magnitude of the harmonics of the same frequency as the supply voltages, and causes the corresponding increase in kilovolt-ampere demand.

At the end of the positive half period of the phase voltage, curve 53 is again zero, as at 67, and the current curve 55 is again dropping. As the phase voltage curve 53 thereafter becomes negative, the current curve 55 drops rapidly and eventually reaches zero at the point 69, at which time the main valve 19 and the conductive first auxiliary valve 43 become nonconductive. Very shortly thereafter, at the point 71, the main valves 15, 17 and 19 are again controlled to become conductive in the usual way and the second auxiliary valve 45 becomes conductive. Current through common line 25 again flows in a positive direction as illustrated by curve 55 but since the second auxiliary valve 45 is now conductive, the current flows through the second section 37 of the primary winding 33 and with respect to the secondary winding circuit is in the opposite direction as indicated by the broken line curve 57.

The control circuits shown in Fig. 1 are arranged to avoid the commutation fault illustrated in Fig. 2. Three electric discharge valves 73, 75 and 77, preferably of the arc-like type, such as thyratrons, are provided corresponding to the three main valves 15, 17 and 19, respectively. These valves 73, 75 and 77 act as firing valves and the anode 79 of each firing valve is connected to the anode 21 of the corresponding main valve, while the cathode 81 of each firing valve is connected through a current-limiting resistor 83 to the ignition or control electrode 85 of the corresponding main valve.

A three-phase first control transformer 87 is energized from the supply lines 5 through a first phase shifting device 89. The three secondary windings 91, 93 and 95 of this first control transformer 87 are isolated from each other and arranged to correspond to the phase voltages for the main valve 15, 17 and 19, respectively. A second three-phase control transformer 97 is also energized from the supply lines 5 through a second phase shifting device 99. The three secondary windings 101, 103 and 105 of the second control transformer 97 are also isolated from each other and arranged to correspond to the phase voltages for the main valves 15, 17 and 19, respectively. Third and fourth control transformers 107 and 109, each having three secondary windings 111, 113 and 115, and 117, 119 and 121, respectively, are also provided.

The control circuit of the firing valve 73 for the first main valve 15 may be traced from the grid 123 through a grid resistor 125, the corresponding secondary windings 91 and 101 of the first and second control transformers 87 and 97, a source 127 of direct-current biasing voltage, illustrated as a battery and secondary windings 111 and 117 of the third and fourth control transformers 107 and 109 and a resistor 129 to its cathode 81. The control circuit of the second firing valve 75 may likewise be traced from the grid 131 through a grid resistor 133, the corresponding secondary windings 93 and 103 of the first and second control transformers 87 and 97, a source 135 of direct-current biasing voltage and secondary windings 113 and 119 of the third and fourth control transformers 107 and 109, and a resistor 137 to its cathode 81. In a similar manner, the control circuit of the third firing valve 77 may be traced from the grid 139 through a grid resistor 141, the corresponding secondary windings 95 and 105 of the first and second control transformers 87 and 97, a source 143 of direct-current biasing voltage and the secondary windings 115 and 121 of the third and fourth control transformers 107 and 109, and a resistor 145 to its cathode 81.

The biasing voltage in the control circuit of each firing valve is normally sufficient to maintain that valve nonconductive. The first control transformer 87 is a peaking transformer which provides a peaked voltage impulse in the control circuit of each firing valve sufficient to overcome the biasing voltage therein. The first phase shifting device 89 is to be adjusted so that the voltage impulses supplied through the first control transformer 87 to the control circuits occur at a preselected instant in each positive half period of the corresponding supply phase voltage. The instant is selected to occur after the corresponding supply phase voltage has become more positive than the other supply phase voltages at an instant selected according to the heat desired at the weld. The earlier the instant the greater the voltage applied to the primary winding of the welding transformer and, therefore, the greater the heat developed at the weld.

The second control transformer 97 is also a peaking transformer. However, the peaked voltage impulse impressed in the control circuits of the firing valves by the second control transformer 97 is adjusted by means of the second phase shifting device 99 to occur in each negative half period of the corresponding supply phase voltage. The instant in a negative half period, at which such an impulse occurs, is to be early in a negative half period while the corresponding phase voltage is more positive than the other phase voltage which is then in a negative half period. Since the impulses supplied from the second control transformer 97 occurs in a negative half period of the corresponding phase voltage, they have no effect upon the conductivity of the main valves so long as the first control transformer 87 is effective to render the main valves conductive in each positive half period.

The third and fourth control transformers 107 and 109 are of a type constructed for very low frequency. As will be explained hereinafter, these transformers supply voltage to the control circuits of the firing valves only during commutation periods.

The primary winding 147 of the third control transformer 107 is connected through a resistor 149 across the output lines 151 and 153 of a square wave voltage generator 155. A unidirectional conducting device 157, such as a dry rectifier, is connected across the primary winding 147 to conduct current in a direction from one output line 153 of the square wave generator to the other output line 151. A first high vacuum tube 159 has its anode 161 and cathode 163 also connected across the primary winding 147 and is arranged to conduct current in the opposite direction from the dry rectifier 157.

The control circuit of the first high vacuum tube 159 extends from the grid 165 through a source 167 of biasing voltage and the secondary winding 169 of a first auxiliary transformer 171 to the cathode 163. The primary winding 173 of the first auxiliary transformer 171 is connected in circuit with another resistor 175 across the anode 48 and cathode 50 of the second auxiliary valve 45.

The primary winding 177 of the fourth control transformer 109 is also connected across the output lines 151 and 153 of the square wave generator 155 through a resistor 179. A unidirectional conducting device 181, such as a dry rectifier, is also connected across the primary winding 177 and is arranged to conduct current in the opposite direction between the two output lines 151 and 153, as the dry rectifier 157 across the primary winding 147 of the third control transformer 107. A second high vacuum tube 183 also has its anode 185 and cathode 187 connected in circuit across the primary winding 177 of the fourth control transformer 109 to conduct current in a direction opposite to that of the dry rectifier 181.

The control circuit of the second high vacuum tube 183 may be traced from the grid 189 through another source 191 of biasing voltage and a secondary winding 193 of a second auxiliary transformer 195 to the cathode 187. The primary winding 197 of the second auxiliary transformer 195 is connected in series with another resistor 199 across the anode 44 and cathode 46 of the first auxiliary valve 43.

It is to be understood that the first and second auxiliary transformers 171 and 195 are of the type responsive to very low frequency input voltage.

A pair of electric discharge valves 201 and 203, preferably of the arc-like type, such as thyratrons, are provided as firing valves corresponding to the first and second auxiliary valves 43 and 45, respectively. The anode 205 and cathode 207 of the first auxiliary firing valve 201 are connected in circuit with a current-limiting resistor 209 between the anode 44 and ignition or control electrode 211 of the corresponding first auxiliary valve 43. The anode 213 and cathode 215 of the second auxiliary firing valve 203 are connected in circuit with a current-limiting resistor 217 between the anode 48 and ignition or control electrode 219 of the second auxiliary valve.

The control circuit of the first auxiliary firing valve 201 may be traced from the grid 221 through a grid resistor 223, a source 225 of biasing voltage, a secondary winding 227 of a transformer 229 whose primary winding 231 is energized from the square wave generator 155, and another secondary winding 233 of the first auxiliary transformer 171 to the cathode 207.

The control circuit of the second auxiliary firing valve 203 may be traced from the grid 235 through a grid resistor 237, a source 239 of biasing voltage, another secondary winding 241 of the transformer 229 supplied from the square wave generator, and another secondary winding 243 of the second auxiliary transformer 195 to the cathode 215.

An auxiliary source 245 of direct-current voltage is connected in series with a very high impedance, such as resistor 247, between the anodes of the auxiliary valves 43 and 45 and the center tap 39 of the primary winding of the welding transformer through starting switch 248. The purpose of this auxiliary source 245 appears in the following discussion of the operation of the system.

Prior to initiation of operation of the apparatus, the square wave voltage generator 155 is placed in operation and heating current is supplied to the filaments of the various valves and tubes by conventional means which, for purposes of clarity in the drawings, are not illustrated. The square wave voltage generator 155 then causes a square wave voltage to appear between the output lines 151 and 153 thereof. The frequency of the output is adjusted to the low frequency desired in the welding load. Then the circuit breaker 7 is to be closed followed by closure of starting switch 248.

If the first output line 151 of the square wave generator 155 is positive when the starting switch 248 is closed, current flows through the dry rectifier 181 shunting the primary winding 177 of the fourth control transformer 109 so that no voltage is impressed thereby in the control circuits of the firing valves 73, 75 and 77. Since the second auxiliary valve 45 is nonconductive, voltage from the direct-current voltage source 245 appears across the primary winding 173 of the first auxiliary transformer 171 and acts through secondary winding 169 in opposition to the biasing voltage of source 167 on the first high vacuum tube 159 to cause that tube to conduct current. The first high vacuum tube 159 then effectively short-circuits the primary winding 147 of the third control transformer 107 and that transformer likewise does not impress a voltage in the control circuits of the firing valves 73, 75 and 77 for the main valves 15, 17 and 19.

If the second output line 153 of the square wave generator 155 is positive, the second high vacuum tube 183 is conductive because of the voltage supplied through the second auxiliary transformer 195 and a voltage is not impressed in the control circuits of the firing valves 73, 75 and 77 through the fourth control transformer 109. At the same time, the dry rectifier 157 shunting the primary winding 147 of the third control transformer 107 prevents that transformer from impressing a voltage in the control circuits.

Since the third and fourth control transformers 107 and 109 do not impress a voltage in the control circuits of the firing valves 73, 75 and 77 as the starting switch 248 is closed, the first voltage impulse from the first control transformer 87 causes the firing valve of the main valve for the phase voltage which is more positive at that time to become conductive and render the corresponding main valve conductive. The three main valves are then rendered conductive in succession by the voltage impulses supplied through the first control transformer 87.

At the time the starting switch 248 is closed, the square wave generator 155 is impressing a voltage in the control circuit of each of the first and second auxiliary firing valves 201 and 203 through transformer 229. The first and second auxiliary transformers 171 and 195 are also impressing a voltage in each of the control circuits of the auxiliary firing valves 201 and 203. The voltages so impressed by the auxiliary transformers 171 and 195 oppose the biasing voltages of the sources 225 and 239 in the respective control circuits. The voltage supplied from the square wave generator in the control circuit of one of the auxiliary valves also opposes the biasing voltage, while the voltage so supplied from the square wave generator in the control circuit of the other firing valve aids the biasing voltage. These voltages are so related that the voltage supplied from an auxiliary transformer is not sufficient to overcome the biasing voltage when also opposed by the voltage from the square wave generator. Moreover, when a voltage is not supplied through an auxiliary transformer, the voltage supplied from the square wave generator is insufficient to overcome the biasing voltage and render a firing valve conductive. However, the voltage from an auxiliary transformer added to the voltage of the square wave generator is sufficient to overcome the biasing voltage and the corresponding firing valve is rendered conductive to render the corresponding auxiliary valve conductive.

With the three main valves 15, 17 and 19 becoming conductive in succession to supply current through the particular auxiliary valve which is conductive and its associated section of the primary winding of the welding transformer, the current through the load gradually builds up and the system reaches the condition illustrated at the left end of Fig. 3. In Fig. 3 as in Fig. 2, time is represented horizontally, while voltage and current is represented vertically with the horizontal line 250 representing zero current and zero voltage. The sine wave curves 251, 252, and 253 represent the three-phase voltages of the supply transformer 9 and correspond to the phase voltages for main valves 15, 17 and 19, respectively. The full line portion of each curve 251, 252 and 253 represents the part during which the corresponding main valve is conductive, and the dotted line portion represents the part during which the corresponding main valve is nonconductive. The current through the common line 25 is represented by the other full line curve 255. As in Fig. 2, the load current flows alternately in opposite directions as represented by curve 255 at the left of the figure and the broken line curve 257 at the right end of the figure.

In considering the commutation operation of the apparatus of Fig. 1 as illustrated in Fig. 3, let it be assumed that the main valves are conducting in succession, and the first auxiliary valve 43 is conductive with the output line 151 of the square wave generator being positive. Then at the point 259 the square wave generator causes the line 151 to become negative and the line 153 to become positive. When line 153 becomes positive, the voltage impressed in the control circuit of the second auxiliary firing valve 203 from the square wave generator opposes the biasing voltage therein. However, with the first auxiliary valve 43 conductive, the primary winding 197 of the second auxiliary transformer 195 is substantially short-circuited so that substantially no voltage is impressed by that transformer in the control circuit of the second auxiliary firing valve 203. As previously indicated, the voltage impressed in the control circuit from the square wave generator is not alone sufficient to overcome the biasing voltage and render the second auxiliary firing valve 203 conductive.

Although no immediate effect is observed with respect to the auxiliary valves when the square wave generator changes the polarity of output lines 151 and 153, an effect is produced immediately upon the control circuits of the firing valves 73, 75 and 77 of the three main valves 15, 17 and 19. With the line 153 positive, the third control transformer 107 remains ineffective as current is shunted through the dry rectifier 157. However, the polarity is such that current cannot flow through the dry rectifier 181 shunting the primary winding 177 of the fourth control transformer 109. Moreover, the voltage impressed from the second auxiliary transformer 195 in the grid circuit of the second vacuum tube 183 shunting the primary winding 177 is no longer present since the first auxiliary valve 43 is conductive. Consequently, the biasing voltage in the grid circuit prevents the second vacuum tube 183 from conducting. As a result, a voltage appears across the primary winding 177 of the fourth control transformer 109 and a corresponding voltage is impressed in the control circuits of the firing valves 73, 75, and 77 of the main valves 15, 17 and 19.

It is to be understood that the voltage impulses supplied from the second control transformer 97, while of the same polarity as those from the first control transformer 87, are greater in magnitude. The voltage impressed in the control circuits from the fourth control transformer 109 is sufficient when added to the direct-current voltage of sources 127, 135 and 143 to block out the effect of the voltage impulse from the first control transformer 87, but not to block out the effect of the voltage impulse from the second control transformer 97. It follows that those main valves 15 and 17 which are not conductive when the output of the square wave generator changes, as at point 259 in Fig. 3, are not rendered conductive in turn by voltage impulses from the first control transformer 87. The main valve 19, which is conductive when the output of the square wave generator changes, continues to conduct while the corresponding phase voltage curve 253 drops to zero at the point 261. Because of the inductance in the circuit, the current curve 255 is still highly positive at that time so main valve 19 continues to conduct while the corresponding phase voltage curve 253 becomes negative. Before the phase voltage curve 253 again becomes positive, a voltage impulse from the second control transformer 97 is impressed in the control circuit of the firing valve 73 for the main valve 15 corresponding to the next succeeding phase voltage curve 251, as at point 263. Since the succeeding phase voltage curve 251 is at that instant more positive than the phase voltage curve 253 of the conductive main valve 19, the main valve 15 becomes conductive to pick up the flow of current and cause the formerly conductive main valve 19 to become nonconductive. The succeeding main valve 15 continues to conduct in the negative half period of voltage curve 251 so that the current curve 255 is forced rapidly to zero as at point 265 by the inverter action. If the current curve 255 should still be positive when the next impulse is provided by the second control transformer 97, the next main valve 17 is rendered conductive. Thus, the operation of the main valves as inverters continues until the current reaches zero.

Whenever the current flow drops to zero, the conductive main valve becomes nonconductive as does the first auxiliary valve 43, since the impedance of resistor 247 is sufficiently high to prevent the source 245 from maintaining an arc in the auxiliary valve. As the first auxiliary valve 43 ceases to conduct, a voltage appears across the second auxiliary transformer 195. This voltage is effective in the control circuit of the second vacuum tube 183 to cause that tube to conduct. As a result, the primary winding 177 of the fourth control transformer 109 is short-circuited and the voltage formerly supplied thereby to the control circuits of the main valves is removed. The voltage impulses from the first control transformer 87 then become effective to render the main valves conductive in succession as rectifiers to supply unidirectional current from the supply transformer.

The voltage on the second auxiliary transformer 195 when the first auxiliary valve 43 becomes nonconductive is also effective in combination with the voltage from the square wave generator 155 in the control circuit of the second auxiliary firing valve 203 to cause the second auxiliary valve 45 to become conductive. As a result, current flows through the second section 37 of the primary winding 33 in the opposite direction and gradually buids up as indicated by curve 255 at the right end of Fig. 3.

After an interval of time determined by the frequency of the square wave generator, the output line 151 again becomes positive with respect to line 153. The action on the various control circuits is then similar to that previously described when line 153 becomes positive, but with the third control transformer 107 being effective instead of the fourth control transformer 109. In this situation, the fourth control transformer 109 remains ineffective as current flows through the dry rectifier 181, shunting the primary winding 177 thereof. On the other hand, a voltage appears across the third control transformer 107 as the first vacuum tube 159 is nonconductive because the voltage across the first auxiliary transformer 171 drops substantially to zero when the second auxiliary valve 45 becomes conductive.

The voltage impressed from the third control transformer 107 in the control circuits of the main valves again renders the voltage impulses from the first control transformer 87 ineffective and permits the voltage impulses from the second control transformer 97 to operate the main valves as inverters. Consequently, the current through the main valves is forced rapidly to zero. The conductive main valve and the second auxiliary valve 45 then become non-conductive. Immediately thereafter, the voltage supplied by the third control transformer 107 is removed so that the main valves are again rendered conductive as rectifiers, and the first auxiliary valve 43 becomes conductive to initiate a new cycle of current.

Although I have shown and described a preferred embodiment of my invention, I realize that many modifications thereof are possible without departing from the spirit of the invention. I do not intend, therefore, to limit my invention to the specific embodiment disclosed.

I claim as my invention:

1. For use in supplying current to a load through a single-phase transformer having a primary winding with two sections and a secondary winding connected to said load, the combination comprising means adapted to function as a source of polyphase alternating voltage having an output terminal for each phase and a common return terminal, main valve means connected between each output terminal and a common line, a pair of auxiliary valves of the arc-like type, each of said sections having one of said auxiliary valves in circuit therewith between said common line and said return terminal whereby current through the first auxiliary valve and its associated section effects a load current in one direction and through the second auxiliary valve and associated section effects an opposite load current, first control means normally causing said main valve means to function as rectifiers, second control means for rendering the first auxiliary valve conductive, and means for reversing the load current including means connected to said first control means effective to cause said main valve means to function temporarily as inverters until current therethrough ceases and means operable upon said first auxiliary valve becoming nonconductive to render the second auxiliary valve conductive.

2. For use in supplying current to a load through a single-phase transformer having a primary winding with two sections and a secondary winding connected to said load, the combination comprising means adapted to function as a source of polyphase alternating voltage having an output terminal for each phase and a common return terminal, main valve means connected between each output terminal and a common line, a pair of auxiliary valves of the arc-like type, each of said sections having one of said auxiliary valves in circuit therewith between said common line and said return terminal whereby current through the first auxiliary valve and its associated section effects a load current in one direction and through the second auxiliary valve and associated section effects an opposite load current, first control means normally causing said main valve means to function as rectifiers, and second control means for causing said auxiliary valves to conduct current alternately including means for rendering conductive the auxiliary valve whose turn it is to conduct upon the other auxiliary valve being non-conductive and means connected to said first control means and operable at predetermined periodic intervals to cause said main valve means to function temporarily as inverters until current therethrough ceases.

3. For use in supplying current to a load through a single-phase transformer having a primary winding with two sections and a secondary winding connected to said load, the combination comprising means adapted to function as a source of polyphase alternating voltage having an output terminal for each phase and a common return terminal, main unidirectional valve means connected between each output terminal and a common line, a pair of auxiliary valves of the arc-like type, each of said sections having one of said auxiliary valves in circuit therewith between said common line and said return terminal whereby current through the first auxiliary valve and its associated section effects a load current in one direction and through the second auxiliary valve and associated section effects an opposite load current, first control means normally causing each said main valve means to conduct current only in each positive half period of the corresponding phase voltage, second control means for rendering the first auxiliary valve conductive, and means for reversing the load current including means connected to said first control means effective to cause each said main valve means temporarily to conduct current only in each negative half period of the corresponding phase voltage until current therethrough ceases and means operable upon said first auxiliary valve becoming nonconductive to render the second auxiliary valve conductive.

4. For use in supplying current through two inductive loads alternately, the combination comprising means adapted to function as a source of polyphase alternating voltage having an output terminal for each phase and a common return terminal, main valve means of the arc-like type connected between each output terminal and a common line, a pair of auxiliary valves of the arc-like type, each of said loads having one of said auxiliary valves in circuit therewith between said common line and said return terminal, first control means normally rendering each said main valve means conductive only in each positive half period of the corresponding phase voltage, second control means for rendering the first auxiliary valve conductive whereby current flows through said one load, and means for transferring current from said one load to the other including means connected to said first control means temporarily effective to render each said main valve means conductive only in each negative half period of the corresponding phase voltage until current therethrough ceases and means operable upon said first auxiliary valve becoming nonconductive to render the second auxiliary valve conductive.

5. For use in supplying current through two inductive loads alternately, the combination comprising means adapted to function as a source of polyphase alternating voltage having an output terminal for each phase and a common return terminal, main valve means of the arc-like type connected between each output terminal and a common line, a pair of auxiliary valves of the arc-like type, each of said loads having one of said auxiliary valves in circuit therewith between said common line and said return terminal, first control means normally rendering each said main valve means conductive only in each positive half period of the corresponding phase voltage at a preselected instant while that corresponding phase voltage is more positive than the other phase voltages, second control means for rendering the first auxiliary valve conductive whereby current flows through said one load, and means for transferring current from said one load to the other including means connected to said first control means temporarily effective until current through said main valve means ceases to render each said main valve means conductive only at an instant early in each negative half period of the corresponding phase voltage while that corresponding phase voltage is more positive than any other phase voltage then in a negative half period and means operable upon said first auxiliary valve becoming nonconductive to render the second auxiliary valve conductive.

6. For use in supplying current through two inductive loads alternately, the combination comprising means adapted to function as a source of polyphase alternating voltage having an output terminal for each phase and a common return terminal, main unidirectional valve means connected between each output terminal and a common line, a pair of auxiliary valves of the arc-like type, each of said loads having one of said auxiliary valves in circuit therewith between said common line and said return terminal, first control means normally causing each said main valve means to conduct current only in each positive half period of the corresponding phase voltage, and second control means for causing said auxiliary valves to conduct current alternately including means for rendering conductive the auxiliary valve whose turn it is to conduct upon the other auxiliary valve being nonconductive and means connected to said first control means and operable at predetermined periodic intervals to cause said main valve means temporarily to conduct current only in each negative half period of the corresponding phase voltage until current therethrough ceases.

7. For use in supplying current through two inductive loads alternately, the combination comprising means adapted to function as a source of polyphase alternating voltage having an output terminal for each phase and a common return terminal, main valve means of the arc-like type connected between each output terminal and a common line, a pair of auxiliary valves of the arc-like type, each of said loads having one of said auxiliary valves in circuit therewith between said common line and said return terminal, first control means normally rendering each said main valve means conductive only in each positive half-period of the corresponding phase voltage at a preselected instant while that corresponding phase voltage is more positive than the other phase voltages, and second control means for causing said auxiliary valves to conduct current alternately including means for rendering conductive the auxiliary valve whose turn it is to conduct upon the other auxiliary valve being nonconductive and means connected to said first control means and temporarily operable at predetermined periodic intervals, until current through said main valve means ceases, to render each said main valve means conductive only at an instant early in each negative half period of the corresponding phase voltage while that corresponding phase voltage is more positive than any other phase voltage then in a negative half period.

8. For use in supplying current through two inductive loads alternately, the combination comprising means adapted to function as a source of polyphase alternating voltage having an output terminal for each phase and a common return terminal, main valves of the arc-like type connected between each output terminal and a common line, a pair of auxiliary valves of the arc-like type, each of said loads having one of said auxiliary valves in circuit therewith between said common line and said return terminal, a control circuit for each main valve arranged normally to maintain it nonconductive, means for impressing a first voltage impulse in each said control circuit in each positive half period of the corresponding phase voltage effective to render the corresponding main valve conductive, means for also impressing a second voltage impulse in each control circuit tending to render the corresponding main valve conductive in each negative half period of the corresponding phase voltage at an instant at which said corresponding phase voltage is more positive than any other phase voltage then in a negative half period, control means for causing said auxiliary valves to conduct current alternately including means for rendering conductive the auxiliary valve whose turn it is to conduct upon the other auxiliary valve being nonconductive, and means connected with said control circuits and operable at periodic intervals for rendering said first impulse ineffective until the supply of current through said main valves ceases.

9. For use in supplying current through two inductive loads alternately, the combination comprising means adapted to function as a source of polyphase alternating voltage having an output terminal for each phase and a common return terminal, main valve means connected between each output terminal and a common line, a pair of auxiliary valves of the arc-like type, each of said loads having one of said auxiliary valves in circuit therewith between said common line and said return terminal, first control means normally causing said main valve means to function as rectifiers, a square wave voltage generator of a desired periodicity less than that of said alternating voltage, second control means responsive to an output voltage of said generator of one polarity to render the first auxiliary valve conductive when the second auxiliary valve is nonconductive, third control means responsive to an output voltage of said generator of opposite polarity to render the second auxiliary valve conductive when the first auxiliary valve is nonconductive, and means connected to said first control means and responsive to each reversal of polarity of said output voltage to cause said main valve means to function temporarily as inverters until current therethrough ceases.

10. Apparatus for use in supplying current through two inductive loads alternately, comprising means adapted to function as a source of alternating voltage, main valve means connected in circuit with said source to conduct current therefrom, first control means connected to said main valve means normally causing said main valve means to function as a rectifier, a first auxiliary valve connecting one of said loads in circuit with said source and main valve means, a second auxiliary valve connecting the other of said loads in circuit with said source and main valve means, second control means connected to said first auxiliary valve to render it conductive whereby current from said source flows through said one load, and means for transferring current from said one load to the other load including means connected to said first control means operable to cause said main valve means to function temporarily as an inverter until current therethrough ceases and means connected to the second auxiliary valve and operable upon said first auxiliary valve becoming nonconductive to render the second auxiliary valve conductive.

11. Apparatus for use in supplying current through two inductive loads alternately, comprising means adapted to function as a source of alternating voltage, main valve means connected in circuit with said source to conduct current therefrom, first control means connected to said main valve means normally causing said main valve means to function as a rectifier, a first auxiliary valve connecting one of said loads in circuit with said source and main valve means, a second auxiliary valve connecting the other of said loads in circuit with said source and main valve means, and second control means for causing said auxiliary valves to conduct current alternately including means connected to said auxiliary valves for rendering conductive the auxiliary valve whose turn it is to conduct, upon the other auxiliary valve being nonconductive and means connected to said first control means and operable at periodic intervals to cause said main valve means to function temporarily as an inverter until current therethrough ceases.

12. Apparatus for use in supplying current through two inductive loads alternately, comprising means adapted to function as a source of polyphase alternating voltage, a main valve connected to each phase of said source to conduct current therefrom, first control means connected to said main valves normally causing them to conduct current only in positive half-periods of the corresponding phase voltages to function as rectifiers, a first auxiliary valve connecting one of said loads in circuit with said source and main valve means, a second auxiliary valve connecting the other of said loads in circuit with said source and main valve means, second control means connected to said first auxiliary valve to render it conductive whereby current from said source flows through said one load, and means for transferring current from said one load to the other including means connected to said first control means operable to cause said main valves temporarily to conduct current only in negative half-periods of the corresponding phase voltages to function as inverters until current therethrough ceases and means connected to the second auxiliary valve and operable upon said first auxiliary valve becoming nonconductive to render the second auxiliary valve conductive.

RICHARD L. LONGINI.